(12) United States Patent
Gaedke et al.

(10) Patent No.: US 7,729,323 B2
(45) Date of Patent: Jun. 1, 2010

(54) METHOD FOR ISOCHRONOUS DATA TRANSPORT OVER A WIRELESS NETWORK

(75) Inventors: Klaus Gaedke, Hannover (DE); Sébastien Perrot, Rennes (FR); Gilles Straub, Acigné (FR)

(73) Assignee: Thomson Licensing, Boulogne-Billancourt (FR)

( * ) Notice: Subject to any disclaimer, the term of this patent is extended or adjusted under 35 U.S.C. 154(b) by 1546 days.

(21) Appl. No.: 10/276,130

(22) PCT Filed: May 15, 2001

(86) PCT No.: PCT/EP01/05570

§ 371 (c)(1),
(2), (4) Date: Nov. 13, 2002

(87) PCT Pub. No.: WO01/89152

PCT Pub. Date: Nov. 22, 2001

(65) Prior Publication Data

US 2003/0123427 A1 Jul. 3, 2003

(51) Int. Cl.
*H04Q 7/24* (2006.01)
(52) U.S. Cl. ........................ 370/338; 370/474
(58) Field of Classification Search .................. 370/328, 370/338, 349, 389, 392, 465, 469, 473, 474
See application file for complete search history.

(56) References Cited

U.S. PATENT DOCUMENTS

| | | | | |
|---|---|---|---|---|
| 5,594,732 A * | 1/1997 | Bell et al. | ................... | 370/401 |
| 6,088,342 A * | 7/2000 | Cheng et al. | ................ | 370/320 |
| 6,505,034 B1 * | 1/2003 | Wellig | .......................... | 455/69 |
| 6,553,540 B1 * | 4/2003 | Schramm et al. | ............ | 714/790 |
| 6,678,273 B1 * | 1/2004 | Brown | ...................... | 370/395.2 |
| 6,801,544 B1 * | 10/2004 | Rijckaert et al. | ............ | 370/473 |
| 6,963,534 B1 * | 11/2005 | Shorey et al. | ................. | 370/230 |
| 7,051,355 B1 * | 5/2006 | Inose et al. | .................. | 725/71 |
| 2001/0046231 A1 * | 11/2001 | Hirasawa | ..................... | 370/389 |
| 2002/0129315 A1 * | 9/2002 | Onvural et al. | .............. | 714/758 |

OTHER PUBLICATIONS

R.H.J. Bloks: "The IEEE-1394 High Speed Serial Bus" Philips Journal of Research; Elsevier, Amstedam, NL, vol. 50, No. 1/2, Jul. 1, 1996, pp. 209-216.
D.V. James: "Hiperlan-2 Wireless Informative Annex, As Submitted to the P1394.1 Committee" Working Group P1394/BRO54R01, Oct. 12, 1999, pp. 1-12.
J.K. Jush et al "ETSI Project Bran Hiperlan Type 2 for IEEE 1394 Applications System Overview" IEEE P1394.1 Group Meeting, Oct. 14, 1999, pp. 1-18.

* cited by examiner

*Primary Examiner*—Ricky Ngo
*Assistant Examiner*—Christine Ng
(74) *Attorney, Agent, or Firm*—Robert D. Opalaeh; Joseph J. Opalaeh; Jerome G. Schaefer

(57) ABSTRACT

Method for isochronous data packet transport over a wireless network, comprising the steps of:
  collecting a plurality of isochronous data packets at a service specific convergence sub-layer of a wireless source device;
  posting said plurality of isochronous data packets as a whole to a common part convergence sub-layer of the wireless source device, wherein said plurality of isochronous data packets posted to the common part convergence sub-layer corresponds to the amount of isochronous data packets generated by a transmitter over a 2 ms period.

7 Claims, 4 Drawing Sheets

Transmitted first

Figure 1:
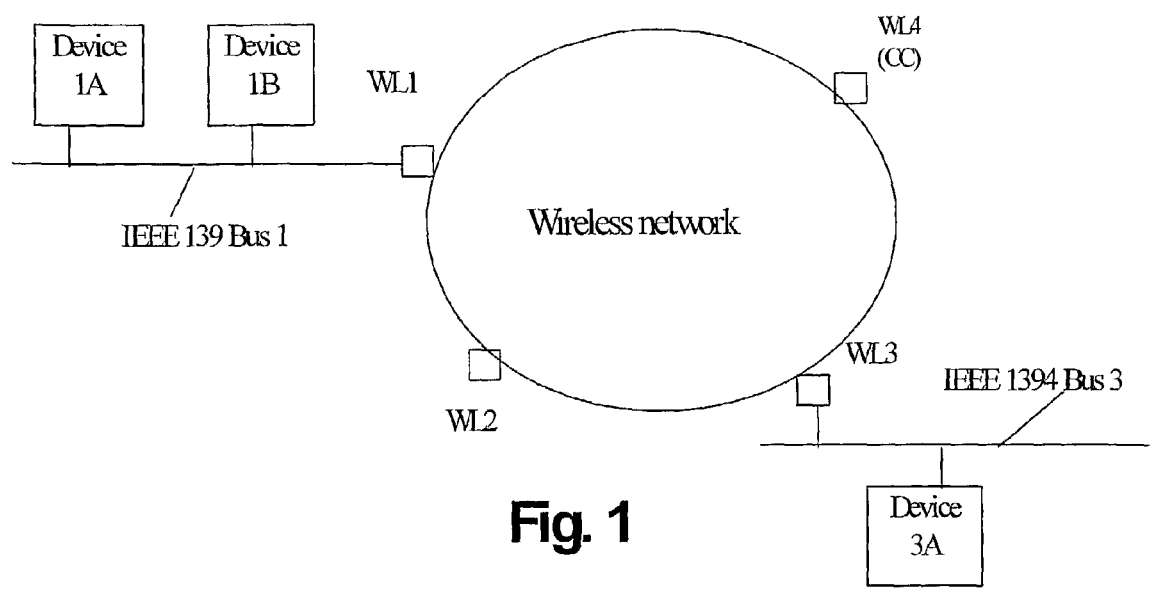

| Command | Reserved | speed | TalkerID | ListenerID |
|---|---|---|---|---|
| Quadlet payloads | | reserved | overhead | |
| Isochronous channel number | | | | |

Transmitted last

Fig. 4

Transmitted first

| Command | StreamType | speed | TalkerID | ListenerID |
|---|---|---|---|---|
| Quadlet payloads | | reserved | overhead | |
| Isochronous channel number | | | | |

Transmitted last

Fig. 5

| Bits | | | | | | | | Octets |
|---|---|---|---|---|---|---|---|---|
| 8 | 7 | 6 | 5 | 4 | 3 | 2 | 1 | |
| <<SSCS_encapsulation>> | | | | | | | | 1 |
| Reserved | | | Length = 1 | | | | | 2 |
| SSCS_encapsulation_type | | | | | | | | 3 |

Fig. 6

| Bits | | | | | | | | Octets |
|---|---|---|---|---|---|---|---|---|
| 8 | 7 | 6 | 5 | 4 | 3 | 2 | 1 | |
| <<SSCS_capability>> | | | | | | | | 1 |
| Reserved | | | Length = 1 | | | | | 2 |
| Reserved | | | | | | | MPEG2TS Cap | 3 |

Fig. 7

METHOD FOR ISOCHRONOUS DATA TRANSPORT OVER A WIRELESS NETWORK

This application claims the benefit, under 35 U.S.C. §365 of International Application PCT/EP01/05570, filed May 15, 2001, which was published in accordance with PCT Article 21(2) on Nov. 22, 2001 in English and which claims the benefit of European patent application No. 00401325.6 filed May 15, 2000.

The invention concerns a method for carrying out isochronous data transport over a wireless network.

The context of this invention is the transport of IEEE 1394 services in alternative interconnects (non 1394 based interconnects). This is particularly relevant in the case a wireless network is used to interconnect IEEE 1394 buses.

One example of wireless network is the BRAN HIPERLAN 2 ('HL2') network, which is being specified by ETSI. The HIPERLAN 2 IEEE 1394 Service Specific Convergence Sub-layer (SSCS) aims at providing the services of an IEEE 1394 Link layer. This allows providing an HL2 1394 link interface, and to put such an interface on IEEE 1394 devices. The Service Specific Convergence Sub-Layer passes data to the Common Part Convergence Sub-layer (CPCS) followed by the Segmentation and Reassembly (SAR) sublayer. The CPCS and SAR form the interface between the SSCS and the Data Link Control (DLC) layer.

On the other hand, the document IEC 61883 defines mechanisms to transport IEEE 1394 isochronous services. This document defines in particular how isochronous data packets, such as for example MPEG 2 Transport Stream data (source packets), are to be formatted for insertion into IEEE 1394 isochronous packets.

When MPEG2 (TS) data is sent in a IEEE 1394 isochronous stream, this data is, according to IEC 61883, segmented into several data blocks so that the bandwidth reservation mechanisms over the IEEE 1394 125 µs bus cycle remain efficient by sending some data blocks every cycle and thus avoiding bursts as much as possible. Each MPEG TS packet is segmented into eight data blocks. The segmentation is carried out in order to send data, if possible, every cycle, so as to avoid bursts.

Every 125 µs cycle, an isochronous packet dedicated to a given channel may contain zero, one, two or four data blocks. Each isochronous packet comprises IEEE 1394 packet header and payload Cyclic Redundancy Check ('CRC'). In addition, when the isochronous packet contains at least one data block, a Common Isochronous Packet ('CIP') header of 8 bytes is inserted into the payload of the isochronous packet. The header, CRC and CIP represent 20 bytes of overhead data for every cycle during which data blocks are sent.

For the purpose of transport over the wireless link, it can be imagined that the HIPERLAN 2 SSCS layer of an interface device between a wired bus and the wireless link adds wireless time stamps to the IEEE 1394 isochronous packets and posts them to the Common Part Convergence Layer (CPCS). The CPCS packets are segmented into 48 byte blocks, which correspond to the Data Link Control (DLC) layer slots.

The amount of overhead data is not negligible compared to the amount of payload data, if IEEE 1394 isochronous packets, including the IEC 61883 CIP header and the wireless stamps are posted to the CPCS layer. An improved method for providing transmission of isochronous data over wireless links is desirable.

The object of the invention is method for isochronous data packet transport over a wireless network, comprising the steps of:

collecting a plurality of isochronous data packets at a service specific convergence sublayer (SSCS) of a wireless source device;

posting said plurality of isochronous data packets as a whole to a common part convergence sub-layer (CPCS) of the wireless source device, wherein said plurality of isochronous data packets posted to the common part convergence sub-layer corresponds to the amount of isochronous data packets generated by a transmitter over a wireless frame period.

The inventors recognized that, since the 125 µs IEEE1394 cycle applies only to the wired IEEE 1394 bus, there is no need to take this constraint into account on the wireless link. In particular, it is more efficient to post a plurality of isochronous packets in a concatenated form to the CPCS layer.

Isochronous packets are either provided directly by an application, or received over an IEEE 1394/IEC 61883 bus.

Figure 2:
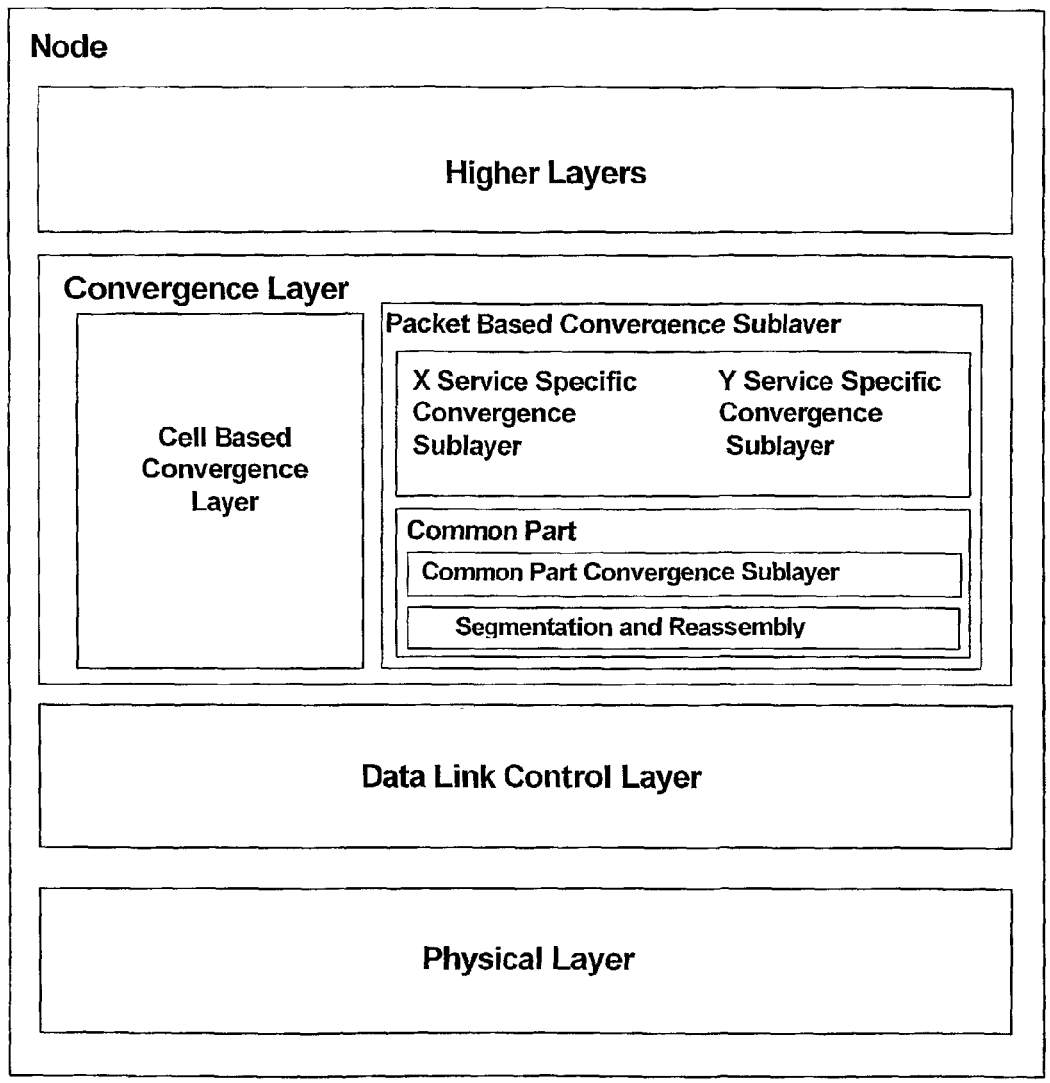
Figure 3:
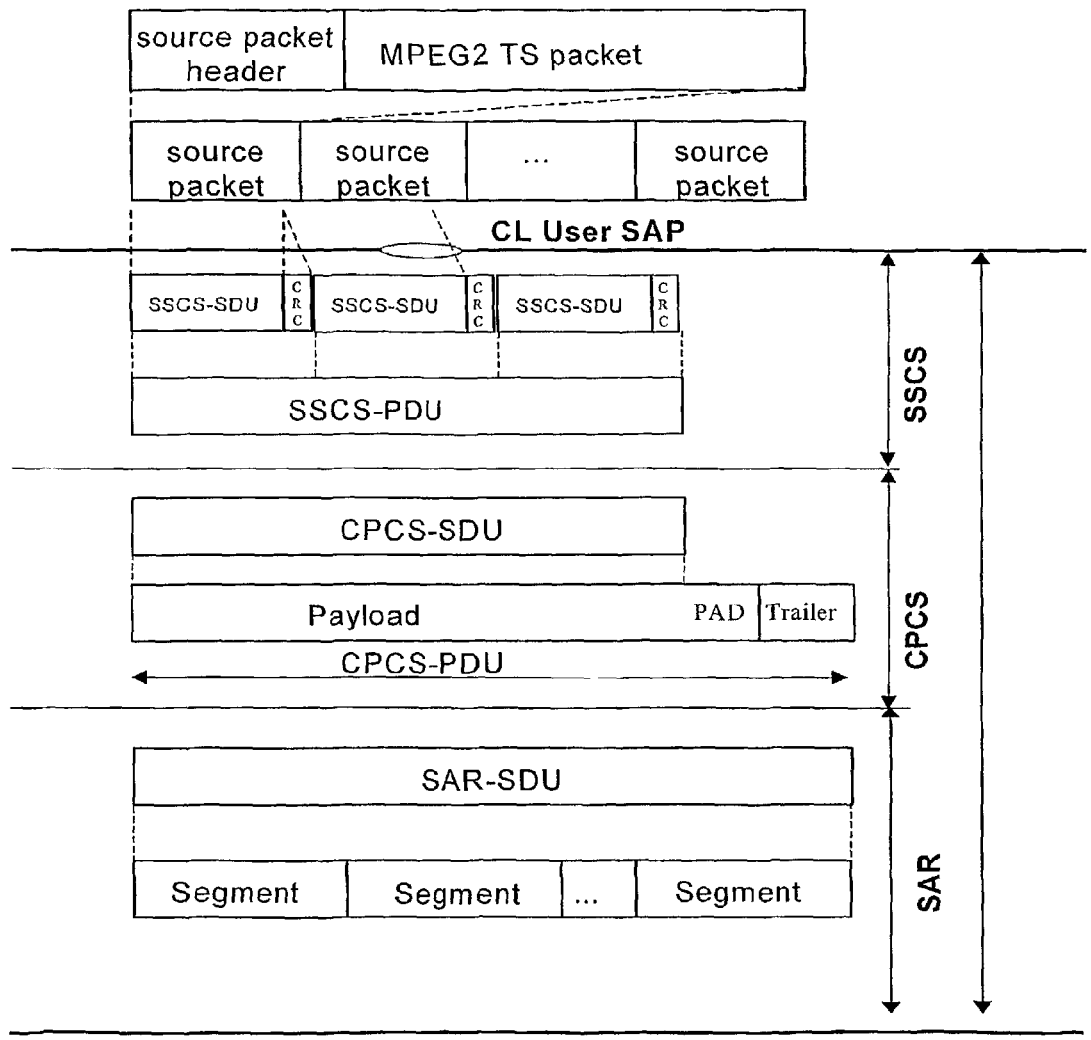

Other characteristics and advantages of the invention shall appear through the description of a preferred embodiment, illustrated by the attached drawings among which:

FIG. 1 represents an example of a network comprising two wired busses and a wireless link between the busses, FIG. 2 represents the protocol stack of an interface device of FIG. 2, i.e. a portal interfacing a wired bus with the wireless link, FIG. 3 is a diagram of the encapsulation method according to the invention, FIG. 4 is a diagram of an isochronous resource manager request packet format (prior art), FIG. 5 is a diagram of an isochronous resource manager request packet format according to the embodiment, FIG. 6 is a diagram of an information element used to select an encapsulation method according to the embodiment, FIG. 7 is a diagram of an information element used during the association process of a device in order to inform a Central Controller as to its capacity to use an encapsulation method according to the embodiment.

The embodiment focuses on ETSI BRAN HIPERLAN 2 ("HL2") as the wireless network technology, but the invention is not limited to this embodiment.

More information regarding IEEE 1394 can be obtained in the documents (a) IEEE Std 1394-1995 'Standard for a High Performance Serial Bus and (b) IEEE Std 1394a-2000 'Standard for a High Performance Serial Bus—Amendment 1'.

Transport of MPEG 2 type data over an IEEE 1394 bus is described by the document (c) IEC 61883-1 (1998-02) Consumer audio/video equipment—Digital interface—Parts 1 and 4.

According to the present embodiment, the wireless links are based on the ETSI BRAN Hiperlan 2 draft standard, and in particular on document (e) 'Broadband Radio Access Networks (BRAN); HIPERLAN Type 2; Packet based convergence layer; Part 3: IEEE 1394 Service Specific Convergence Sublayer (SSCS), version 0.0.0 of Dec. 1999, as well as on document (f) 'Broadband Radio Access Networks (BRAN); HIPERLAN Type 2; Packet based convergence layer; Part 1: Common Part, version 0.g of Nov. 1999.

FIG. 1 is a diagram of a network comprising two IEEE 1394 busses, respectively referenced 1 and 3. A number of IEEE 1394 devices are connected to each bus: devices 1A and 1B to bus 1 and device 3A to bus 3. Portals W1 and W3 are connected respectively to busses 1 and 3, and act as interfaces between the busses and the radio transmission medium. The network comprises further wireless device W2 and W4, which are not connected to an IEEE 1394 wired bus. For the purpose of the present embodiment, device W4 acts as the Central Controller ('CC') of the wireless part of the network.

New devices on the wireless network register with the Central Controller. This phase is called 'association'. Moreover, the Central Controller grants access to wireless network resources and sets up connections between devices of the wireless network. The functionalities of a Central Controller in a Hiperlan 2 network will not be described in more detail, as they are well known from the corresponding HIPERLAN 2 documentation available from ETSI.

In HIPERLAN 2, a time division multiple access/time division duplex (TDMA-TDD) scheme is used. The period of a medium access control (MAC) frame is of 2 ms. This is to be compared with the 125 μs cycle of the IEEE 1394 busses.

FIG. 2 represents the protocol stack of a wireless device (be it a portal or a stand-alone device) in a Hiperlan 2 wireless network. From bottom to top, the stack comprises a physical layer ('PHY'), a data link control Layer ('DLC'), a convergence layer ('CL'), followed by higher layers. The convergence layer CL may be of several types, in particular of the cell based type or of the packet based type. The packet based convergence layer comprises a number of service specific convergence sub-layers ('SSCS'). Examples of SSCS layers currently specified or under specification concern the Ethernet or the IEEE 1394 environment. Below this specific sublayer, a common part convergence sublayer ('CPCS') is included, followed by a segmentation and reassembly sublayer ('SAR').

The convergence layer prepares fixed-size packets ('SAR-PDUs') and forwards them to the data link control layer for transmission.

It is supposed in what follows that an Isochronous Resource Manager (IRM) is defined on the wireless network. Devices wishing to open an isochronous channel and a given bandwidth send requests to the IRM, which reserves the required resources or rejects the reservation request.

It is proposed to define a new isochronous data transport mode allowing native MPEG2 TS to be transported over a Hiperlan 2 link. This will consist in building a source packet (as described in IEC 61183), and send it as it is (without segmenting it into data blocks) over the radio link.

According to a variant embodiment, in order to remain close to IEEE 1394 and IEC 61883, the CIP overhead may be added to the entire source packet. The 1394 isochronous packet header and CRC may be added as well. Nevertheless, this is not the preferred solution: according to the present embodiment, neither CIP nor CRC are used.

At the receiving side, the source packet is buffered, based on the processing of its wireless time stamp, which was added by the SSCS layer of the transmitter. No reconstruction of the packet is needed, since it has not been segmented into data blocks. The receiver buffer size has to be adapted to the jitter (5 ms) over the wireless link.

The transport mode according to the invention may be an optional mode, as a choice among a number of possible transport modes. It may also be mandatory. Both cases as well as their impacts are described in this application.

If the inventive mode is optional, the SSCS layer of a device will indicate to the Central Controller's SSCS during the association whether it supports this mode or not.

An application of a device on the wireless link may ask to use the inventive MPEG2 transport mode or another isochronous packet mode (such as the mode described in the introduction, i.e. where the MPEG TS packets are segmented when it is reserving resources with an Isochronous Resource Manager of the wireless link, using for example a specific field in the lock command used for the reservation.

The Central Controller side will then generate a multicast DLC connection setup, and indicate in an Information Element (IE) in a convergence layer ('CL') container which kind of transport mode is to be used.

Each side of the multicast link knows after this what kind of transport mode is to be used.

According to the present embodiment, the following mode is used for direct MPEG2 over HL2 encapsulation.

The SSCS of the transmitter device appends a Time Stamp as specified by IEC 61883 part 4 to every MPEG2 TS packet of 188 bytes, in order to build a source packet of 192 bytes.

This source packet may be posted as it is to the CPCS for an already established DLC connection. According to a variant embodiment, it is even better that several MPEG2 source packets be collected together and posted as a whole to the CPCS.

As an improvement, a Cyclic Redundancy Check is added to protect any individual source packet. This CRC would be a SSCS specific overhead added to every source packet. Preferably, this CRC is based on the same polynomial as for the IEEE 1394-1995 isochronous packet payload.

According to document (f), packets constructed by the CPCS layer comprise a trailer of four bytes, two of which indicate the length of the payload. Source packets (and also CRC protected source packets) have a known fixed length—192 bytes for non-protected source packets—so that the CPCS length field can be used at the receiving side to recover individual MPEG2 source packets. Each CPCS SDU/PDU comprises an integer number of source packets.

For the sake of consistency with the output plug control register ('oPCR') Payload and Overhead ID fields, as described in a European patent application 00401324.9 filed on May 15, 2000 by the same applicant, having same inventors and entitled "Method for reserving isochronous resources in a wireless network", a transmitter (also called source, or talker) shall generate one CPCS packet for every 2 ms period: several source packets are thus put together into one CPCS packet.

The output plug control register ('oPCR') of the transmitter shall reflect the maximum size of a CPCS packet for a 2 ms period.

The OPCR payload field of the transmitter shall reflect one of the two following types of information:
 the maximum size of the CPCS packet (including source packet bytes, and the SSCSICPCS overhead (source packet CRC added by the SSCS, if it has been added, and the CPCS trailer and padding bytes)); or
 the maximum size of the CPCS packet user data (i.e. the maximum number of sourced packet bytes that the transmitter may generate in a 2 ms period): the oPCR overhead ID field reflects the SSCS/CPCS overhead (source packet CRC, if available and the CPCS trailer and padding bytes).

The difference between the two alternatives is that the overhead is indicated in a separate field of the oPCR register in the second case.

A CPCS packet is not necessarily mapped into one frame: there is no obligation for a CPCS packet to be sent entirely within one HL2 frame. One CPCS packet may be sent over two frames, but one CPCS packet shall contain data corresponding to 2 ms user data traffic.

The encapsulation of the MPEG2 TS according to the invention is shown by the diagram of FIG. 3.

At the receiving side, source packets are recovered by processing the CPCS length field and discarding the padding bytes. Source packets are then buffered by processing the SSCS 'wireless' time stamps so that packets are transmitted with a constant delay. IEC 61883 part 4 mechanisms are still valid, except that the HL2 bus jitter (5 ms) is different from the IEEE 1394 bus jitter (311 μs). The buffer size has to be adjusted accordingly.

Isochronous resource reservation will now be described:

It is supposed in this section that the wireless part of the network comprises an Isochronous Resource Manager (this may typically be the Central Controller) whose task it is to attribute channels and bandwidth to requesting wireless devices.

When an application reserves resources for an isochronous stream, it sends a lock request to the Isochronous Resource Manager ('IRM') of the wireless link, asking for a dedicated channel.

A format of the lock request message is illustrated by FIG. 4.

According to the present embodiment, it is proposed to use some of the reserved bits of the format of FIG. 4 to indicate what kind of SSCS encapsulation is requested, as illustrated by FIG. 5. The value of this new 'streamType' field should be as indicated in Table 1:

TABLE 1

| Value | Status |
|---|---|
| 0x00 | Reserved |
| 0x01 | Asynchronous stream |
| 0x02 | Isochronous stream (isochronous packets encapsulation) |
| 0x03 | Isochronous stream (MPEG2 TS encapsulation according to the present embodiment) |
| Other | Reserved |

When an application sends a lock request asking for an MPEG2 TS 'native' encapsulation according to the invention, the Central Controller may have to check whether this mode is supported, if this mode is only an option. If it is supported, the Central Controller issues a corresponding message to the device having made the lock request, otherwise the isochronous packets encapsulation is used.

According to the present embodiment, the encapsulation scheme which has been selected is indicated in the DLC_MULTICAST_SETUP message in a dedicated Information Element ('IE'), as part of the Convergence Layer container. This message is sent to all devices of a given multicast group.

This IE is illustrated by FIG. 6. Table 2 indicates the signification of each item in this Information Element:

TABLE 2

| Value | Status |
|---|---|
| 0x00 | Reserved |
| 0x01 | Asynchronous stream |
| 0x02 | Isochronous stream (isochronous packets encapsulation) |
| 0x03 | Isochronous stream (MPEG2 TS encapsulation according to the present embodiment |
| Other | Reserved |

This allows any wireless device's SSCS to be informed of the selected encapsulation mode when a DLC multicast connection is set up.

Two cases have been considered here: the transmission mode according to the present embodiment may be mandatory, or may just be an optional feature.

In case of mandatory support, every HL2 wireless device implementing an IEEE 1394 SSCS shall implement this encapsulation mode. When MPEG2 data is transmitted over HL2, this encapsulation mode shall be used.

According to the present embodiment, the oPCR format described in the already cited application is used to reflect how much bandwidth is required to transmit data in this native MPEG2 encapsulation mode.

In case the encapsulation method according to the invention is only optional, there may be devices that support this encapsulation mode, while others will not. According to the embodiment, a mechanism allowing negotiation of an encapsulation method is implemented, as will now be described:

The capability negotiation during the association phase of a wireless device is carried out as follows.

During the association, a wireless device sends its 'EUI64' identifier (which is a fixed identifier unique to this device) to the Central Controller in an Information Element within a 'RLC_INFO' message. Another Information Element has to be defined so that the SSCS capabilities can be described (at least whether the SSCS supports the native MPEG2 TS mode or not). This Convergence Layer capability Information Element can be sent in the same RLC_INFO message as the EUI64 Information Element.

An example of such an Information Element is illustrated by FIG. 7.

In this Information Element, a set MPEG2 TS Cap flag means that the SSCS of the wireless device being associated supports the native MPEG2 mode. Otherwise it only supports the isochronous packet mode.

The Central Controller maintains a database of the capability of each associated device.

In addition to the association process, the resource reservation mechanism also has to deal with this optional feature.

When an application of a wireless device sends a lock request to the Central Controller asking for a MPEG2 TS native encapsulation, the Central Controller has to check whether this mode is supported. If it is supported, it is used, otherwise the Isochronous packet encapsulation is used.

The selected encapsulation scheme is indicated by the Central Controller in the DLC_MULTICAST_SETUP message in a dedicated (and previously described) Information Element, as part of the Convergence Layer container.

When a wireless device implements the native MPEG2 encapsulation and an OPCR, it uses the native MPEG2 encapsulation scheme to express bandwidth requirements in the oPCR: this means that the oPCR payload field shall contain the number of source packet quadlets within one HL2 frame. The overheadID field shall reflect the CPCS overhead within one frame.

If an application makes a reservation, it shall use the OPCR values (payload and overheadID of the source oPCR). The Central Controller then is able to finally decide which encapsulation scheme has to be used (depending on source and sink capabilities), and is also able to make the appropriate calculation if needed (if the native MPEG2 encapsulation cannot be selected because the sink device is not capable), then the isochronous packet encapsulation will be selected, and the Central Controller is able to know (based on IEC 61883 part 4) rules how many isochronous packets will be built and what will be the total amount of data (one packet every 125 μs cycle including a CIP header and a isochronous packet header put into one CPCS packet).

The gain in efficiency of this method resides in minimizing the padding. When one wireless packet is built, a padding is added so that the wireless packet is an integer number of 48 bytes. If a wireless packet contained only one isochronous packet, a padding would be added to every 1394 isochronous packet. With the present method, a wireless packet contains several 1394 isochronous packet payloads, and is generated every HL2 frame. Thus padding is generated only every HL2 frame (2 ms) and not every 1394 cycle (125 μs).

The invention claimed is:

1. Method, in a system comprising a wireless network, a source device connected to the wireless network and a sink device connected to the wireless network, for transmission of an isochronous source packet between the source device and the sink device; the method comprising, at a wireless device:
   selecting one transmission mode of said isochronous source packet among:
   a first mode comprising collecting more than one source packet in a packet and posting said packet to a given protocol layer, without prior segmentation into a plurality of data packets, said more than one source packet corresponding to the amount of packets transmitted over one wireless frame period, and
   a second mode comprising posting each said source packet in segmented form into a plurality of data packets to the given protocol layer,
   wherein the second mode is used by default, and the first mode is used if supported by the source device and the sink device.

2. Method according to claim 1, wherein said source packet is an MPEG 2 TS packet.

3. Method according to claim 2, wherein an IEC 61883 CIP header is added to a source packet before transmission.

4. Method according to claim 1, wherein one or more data packets are included as payload into an isochronous data packet of the IEC 61883 type for posting to the given protocol layer according to the second mode.

5. Method according to claim 1, wherein the wireless network is of the Hiperlan 2 type.

6. Method according to claim 1, wherein the given protocol layer is a common part convergence sublayer of the wireless device.

7. Method according to claim 6, wherein a plurality of unsegmented isochronous source packets are fit into a single protocol data unit of the common part convergence sublayer.

* * * * *